US010036307B2

(12) United States Patent
Hotta et al.

(10) Patent No.: US 10,036,307 B2
(45) Date of Patent: Jul. 31, 2018

(54) INTERNAL COMBUSTION ENGINE

(71) Applicant: TOYOTA JIDOSHA KABUSHIKI KAISHA, Toyota-shi, Aichi-Ken (JP)

(72) Inventors: Shintaro Hotta, Susono (JP); Yasuyuki Irisawa, Susono (JP); Hiroyuki Tanaka, Mishima (JP); Shinichiro Nogawa, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/428,349

(22) Filed: Feb. 9, 2017

(65) Prior Publication Data

US 2017/0276059 A1 Sep. 28, 2017

(30) Foreign Application Priority Data

Mar. 28, 2016 (JP) .................................. 2016-063502

(51) Int. Cl.
*F02B 47/08* (2006.01)
*F02B 29/04* (2006.01)
(Continued)

(52) U.S. Cl.
CPC ............ *F02B 29/0493* (2013.01); *F01P 3/18* (2013.01); *F01P 7/16* (2013.01); *F01P 7/164* (2013.01);
(Continued)

(58) Field of Classification Search
CPC .............. F02M 25/07; F02M 25/0707; F02M 25/0709; F02M 25/071; F02M 25/0771;
(Continued)

(56) References Cited

U.S. PATENT DOCUMENTS 6,101,999 A * 8/2000 Ohashi .................. F01N 3/0842
123/295
8,001,768 B2 8/2011 Cleary et al.
(Continued)

FOREIGN PATENT DOCUMENTS

JP H10-068343 A 3/1998
JP 2905315 B2 6/1999
(Continued)

*Primary Examiner* — John Kwon
(74) *Attorney, Agent, or Firm* — Hunton Andrews Kurth LLP (57) ABSTRACT

An internal combustion engine includes an intake air temperature adjustment apparatus that adjusts the temperature of intake air, and a control apparatus that operates at least the intake air temperature adjustment apparatus. When the internal combustion engine operates in a stoichiometric EGR mode, the control apparatus operates the intake air temperature adjustment apparatus so that the temperature of intake air entering a combustion chamber enters a first temperature region. When the internal combustion engine operates in a lean mode, the control apparatus operates the intake air temperature adjustment apparatus so that the temperature of intake air entering a combustion chamber enters a second temperature region that is a lower temperature region than the first temperature region.

3 Claims, 6 Drawing Sheets (51) Int. Cl.
*F02M 26/17* (2016.01)
*F01P 3/18* (2006.01)
*F01P 7/16* (2006.01)
*F02D 41/00* (2006.01)
*F02M 26/06* (2016.01)
*F02D 41/30* (2006.01)

(52) U.S. Cl.
CPC .......... *F01P 7/165* (2013.01); *F02B 29/0425* (2013.01); *F02D 41/005* (2013.01); *F02M 26/17* (2016.02); *F01P 2003/187* (2013.01); *F01P 2025/32* (2013.01); *F01P 2025/42* (2013.01); *F01P 2060/02* (2013.01); *F02D 41/0002* (2013.01); *F02D 41/0052* (2013.01); *F02D 41/0057* (2013.01); *F02D 41/3076* (2013.01); *F02D 2200/023* (2013.01); *F02D 2200/0414* (2013.01); *F02M 26/06* (2016.02); *Y02T 10/146* (2013.01)

(58) Field of Classification Search
CPC .......... F02M 2025/0762; F02D 41/005; F02D 2200/0406; F02D 41/0047; F02D 21/08
USPC .... 123/435, 568.11, 568.21, 568.22, 568.26, 123/568.27, 568.31; 701/108; 60/278, 60/279, 286, 288, 298
See application file for complete search history.

(56) References Cited

U.S. PATENT DOCUMENTS

| | | |
|---|---|---|
| 8,341,943 B2 | 1/2013 | Nagaoka et al. |
| 2016/0109163 A1* | 4/2016 | Enomoto .............. F25B 25/005 62/160 |
| 2016/0169161 A1* | 6/2016 | Okada ................... F02M 26/32 123/41.02 |
| 2017/0276082 A1* | 9/2017 | Hotta ...................... F01L 1/344 |
| 2017/0276098 A1* | 9/2017 | Tanaka ................... F02D 41/30 |

FOREIGN PATENT DOCUMENTS

| | | |
|---|---|---|
| JP | H11-210477 A | 8/1999 |
| JP | 2003-239747 A | 8/2003 |
| JP | 2005-233116 A | 9/2005 |
| JP | 2008-255884 A | 10/2008 |
| JP | 2012-189063 A | 10/2012 |
| JP | 2014-105573 A | 6/2014 |
| WO | 2015/071723 A2 | 5/2015 |

* cited by examiner

INTERNAL COMBUSTION ENGINE

CROSS-REFERENCE TO RELATED APPLICATION

This application is based on and claims the benefit of Japanese Patent Application No. 2016-063502, filed on Mar. 28, 2016, which is incorporated by reference herein in its entirety.

BACKGROUND

Field of the Disclosure

The present disclosure relates to an internal combustion engine, and more particularly to an internal combustion engine that, in accordance with an operating region, switches between a stoichiometric EGR mode in which the engine performs operation at the theoretical air-fuel ratio while executing recirculation by means of an EGR apparatus, and a lean mode in which the engine performs operation at an air-fuel ratio that is leaner in fuel than the theoretical air-fuel ratio without performing EGR by means of the EGR apparatus.

Background Art

An internal combustion engine equipped with a supercharger and a water-type intercooler is disclosed in JP 2005-233116 A that, in accordance with an operating region, switches between an NA lean mode in which lean-burn operation is performed utilizing intake air that is not turbocharged by the supercharger, a turbocharging lean mode that performs lean-burn operation utilizing turbocharged intake air having a high temperature, and a normal turbocharging mode that performs normal combustion operation in a turbocharging state. According to the technology disclosed in the aforementioned JP 2005-233116 A, in the NA lean mode all of the intake air is supplied to a bypass passage that bypasses the intercooler, in the turbocharging lean mode the intake air is shared between the intercooler and the bypass passage, and in the normal turbocharging mode all of the intake air is supplied to the intercooler.

An internal combustion engine equipped with a supercharger and a water-type intercooler is disclosed in JP 2008-255884 A which adjusts the flow rate of intake air that bypasses the intercooler in accordance with the load state of the internal combustion engine. According to the technology disclosed in the aforementioned JP 2008-255884 A, in a high-speed and high-load region the amount of cooling with respect to the intake air is reduced to raise the intake air temperature, and in a low or medium speed region or a low or medium load region, intake air is cooled by the intercooler to lower the intake air temperature.

As described above, technology is known that adjusts an intake air temperature according to the load state of an internal combustion engine.

Note that, in addition to the above described patent literature, JP 11-210477 A and JP 2003-239747 A and the like may be mentioned as examples of literature describing the state-of-the-art at the time of filing the present application.

SUMMARY OF THE DISCLOSURE

In this connection, these days, in order to improve the fuel consumption performance of internal combustion engines, studies are being conducted with a view to expanding to a high load side the operating region in which operation is performed at an air-fuel ratio that is leaner in fuel than the theoretical air-fuel ratio. Further, to improve fuel consumption performance in a high load region in which lean operation is difficult, introduction of a large amount of EGR gas during operation at the theoretical air-fuel ratio is also being studied. Hereunder, an operating mode in which the engine operates at the theoretical air-fuel ratio while executing recirculation is referred to as "stoichiometric EGR mode", and an operation mode in which the engine operates at an air-fuel ratio that is leaner in fuel than the theoretical air-fuel ratio without performing EGR is referred to as "lean mode".

In order to expand an operating region in which the lean mode is performed to the high load side, it is necessary to increase the intake efficiency, and at the same time it is also necessary to suppress a decrease in exhaust gas performance that is caused by destabilization of combustion. Further, if a large amount of EGR gas is introduced during the stoichiometric EGR mode, it is also necessary to suppress the occurrence of situations in which combustion becomes unstable due to fluctuations in the EGR amount between cycles.

The inventors of the present application considered that, in order to satisfy the above described demands in a single internal combustion engine, it is important to appropriately adjust the temperature of intake air that enters a combustion chamber according to the operation mode. However, the conventional technology described above adjusts the intake air temperature according to the load, and none of the various literature described above contains a disclosure or a suggestion with regard to how to favorably adjust the temperature of intake air entering a combustion chamber between operation in the lean mode and operation in the stoichiometric EGR mode.

The present disclosure has been conceived in view of the above described problem, and an object of the present disclosure is to provide an internal combustion engine that, by appropriately adjusting the temperature of intake air that enters a combustion chamber, can expand an operating region in which operation is performed in the lean mode to the high load side while stabilizing combustion in the stoichiometric EGR mode.

An internal combustion engine according to the present disclosure is an internal combustion engine which has an EGR apparatus that recirculates a part of exhaust gas to an intake passage, and which, in accordance with an operating region, switches between a stoichiometric EGR mode in which operation is performed at a theoretical air-fuel ratio while executing recirculation by means of the EGR apparatus and a lean mode in which operation is performed at an air-fuel ratio that is leaner in fuel than the theoretical air-fuel ratio without performing EGR by means of the EGR apparatus, and which includes the apparatuses described hereunder.

The internal combustion engine according to the present disclosure includes an intake air temperature adjustment apparatus that adjusts a temperature of intake air, and a control apparatus that operates at least the intake air temperature adjustment apparatus. The control apparatus is configured to operate the intake air temperature adjustment apparatus so that a temperature of intake air that enters a combustion chamber enters a first temperature region when the internal combustion engine operates in the stoichiometric EGR mode, and to operate the intake air temperature adjustment apparatus so that the temperature of intake air that enters a combustion chamber enters a second temperature region which is a lower temperature region than the first temperature region when the internal combustion engine operates in the lean mode.

According to this configuration, when the internal combustion engine operates in the stoichiometric EGR mode, since intake air of a relatively high temperature is supplied into the combustion chamber, the occurrence of a situation in which combustion becomes unstable due to fluctuations in the EGR amount in each cycle can be suppressed. Further, when the internal combustion engine operates in the lean mode, a decrease in combustion stability due to fluctuations in the EGR amount in each cycle does not arise. Therefore, since intake air of a relatively lower temperature in comparison to the stoichiometric EGR mode can be supplied into the combustion chamber, as a result of an improvement in the intake efficiency, an operating region in which operation can be performed in the lean mode while suppressing combustion instability can be expanded to the high load side.

The first temperature region may be a temperature region that is defined by an error range centering on a first temperature. The second temperature region may be a temperature region that is defined by an error range centering on a second temperature that is lower than the first temperature. Further, errors that define the respective temperature regions may be taken as zero. That is, the control apparatus may be configured to operate the intake air temperature adjustment apparatus so that the temperature of intake air entering the combustion chamber becomes the first temperature when the internal combustion engine operates in the stoichiometric EGR mode, and to operate the intake air temperature adjustment apparatus so that the temperature of intake air entering the combustion chamber becomes the second temperature that is lower than the first temperature when the internal combustion engine operates in the lean mode.

As one embodiment, the internal combustion engine may further include an engine water temperature adjustment apparatus that adjusts a temperature of cooling water (engine water temperature) that flows through an exhaust side of an engine head. In this case, the control apparatus may be configured to operate the engine water temperature adjustment apparatus so that the temperature of cooling water that passes through the engine head enters a third temperature region when the internal combustion engine operates in the stoichiometric EGR mode, and to operate the engine water temperature adjustment apparatus so that the temperature of cooling water that passes through the engine head enters a fourth temperature region that is a higher temperature region than the third temperature region when the internal combustion engine operates in the lean mode.

According to this configuration, when the internal combustion engine operates in the lean mode, because cooling water having a relatively high temperature flows through the exhaust side of the engine head, a wall surface temperature on the exhaust side of the combustion chamber can be raised and the generation of unburned hydrocarbons from the quench area can be suppressed. Further, when the internal combustion engine operates in the stoichiometric EGR mode, since the combustion temperature is high and the exhaust gas temperature is also high, even if unburned hydrocarbons are generated from the quench area, the unburned hydrocarbons can be purified by a catalyst that functions adequately. Therefore, since cooling water of a comparatively lower temperature than in the lean mode can be caused to flow to the exhaust side of the engine head, by suppressing an increase in the wall surface temperature on the exhaust side of the combustion chamber, the occurrence of knocking can be suppressed while also suppressing the discharge of unburned hydrocarbons to outside.

The third temperature region may be a temperature region in which a third temperature is set as an upper limit. The fourth temperature region may be a temperature region defined by an error range centering on a fourth temperature that is a higher temperature than the third temperature, and the error may be set as zero. Hence, the control apparatus may be configured to operate the engine water temperature adjustment apparatus so that the temperature of cooling water that passes through the engine head becomes equal to or less than the third temperature when the internal combustion engine operates in the stoichiometric EGR mode, and to operate the engine water temperature adjustment apparatus so that the temperature of cooling water that passes through the engine head becomes the fourth temperature that is higher than the third temperature when the internal combustion engine operates in the lean mode.

As one embodiment, the intake air temperature adjustment apparatus is configured to adjust the temperature of intake air by heat exchange with outside air, and the engine water temperature adjustment apparatus is configured to cool cooling water by heat exchange with the outside air which undergoes heat exchange at the intake air temperature adjustment apparatus. In this case, when the internal combustion engine operates in the stoichiometric EGR mode, when the temperature of cooling water that passes through the engine head does not decrease as far as the third temperature region by only operating the engine water temperature adjustment apparatus, the control apparatus may also operate the intake air temperature adjustment apparatus so as to allow the temperature of intake air entering the combustion chamber to become higher than the first temperature region.

According to the above configuration, even in a high load region in which heat radiation from the internal combustion engine increases, an increase in the temperature of cooling water flowing through the exhaust side of the engine head can be inhibited and thus an increase in the wall surface temperature on the exhaust side of the combustion chamber can be restricted and the occurrence of knocking can be suppressed.

As described above, according to the internal combustion engine of the present disclosure, by appropriately adjusting the temperature of intake air entering a combustion chamber, an operating region in which operation is performed in the lean mode can be expanded to a high load side while stabilizing combustion in the stoichiometric EGR mode.

DETAILED DESCRIPTION

Embodiments of the present disclosure are described hereunder with reference to the accompanying drawings.

1. Overall Configuration of Internal Combustion Engine

Figure 1:
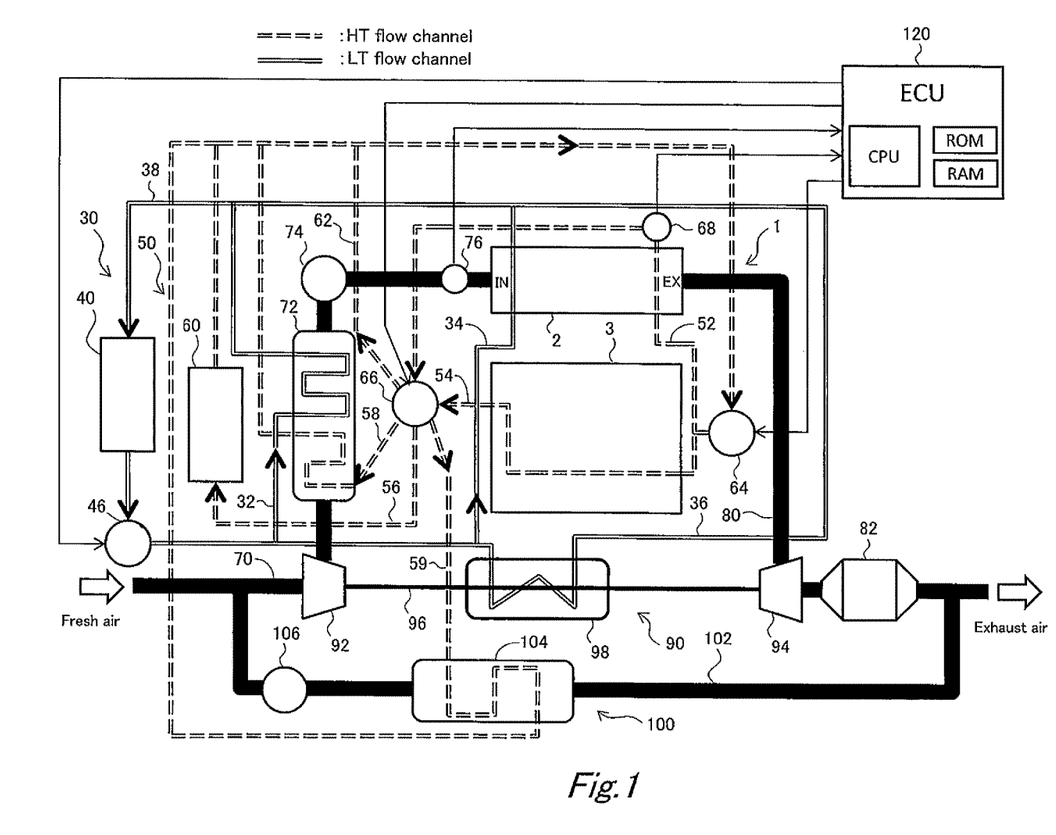
FIG. 1 is a conceptual diagram illustrating the overall configuration of an internal combustion engine of an embodiment.

FIG. 1 is a conceptual diagram illustrating the overall configuration of an internal combustion engine of an embodiment. An internal combustion engine (hereunder, referred to simply as "engine") 1 includes an engine block 3, and an engine head 2 that is arranged via an unshown gasket on the engine block 3.

An intake passage 70 and an exhaust passage 80 are connected to the engine head 2. A compressor 92, an intercooler 72 and an electronically controlled throttle 74 are arranged in that order in the intake passage 70 from the upstream side thereof towards the engine head 2. In the intake passage 70 on the downstream side relative to the throttle 74, an intake-air temperature sensor 76 is installed for measuring the temperature of intake air that is introduced into the engine head 2. In the exhaust passage 80, a turbine 94 and a three-way catalyst 82 are disposed in that order in the downstream direction from the engine head 2. An unshown NOx storage-reduction catalyst (NSR) and selective reduction catalyst (SCR) are disposed in that order at positions that are further downstream in the exhaust passage 80.

The compressor 92 and the turbine 94 constitute a turbocharger 90. The compressor 92 and the turbine 94 are connected by a rotating shaft 96 that is rotatably supported by a bearing 98 and rotate as one body. Although not illustrated in the drawings, a turbine bypass passage that bypasses the turbine 94 and a waste gate valve that opens and closes the turbine bypass passage are provided in the exhaust passage 80.

The engine 1 includes an EGR apparatus 100 that recirculates some of the exhaust gas from the exhaust passage 80 to the intake passage 70. The EGR apparatus 100 is constituted by an EGR passage 102, an EGR cooler 104 and an EGR valve 106. The EGR passage 102 connects the exhaust passage 80 at a position downstream of the three-way catalyst 82 to the intake passage 70 at a position upstream of the compressor 92. The EGR cooler 104 is provided in the EGR passage 102, and cools exhaust gas (EGR gas) that flows through the EGR passage 102. The EGR valve 106 is provided in the EGR passage 102 at a position that is downstream of the EGR cooler 104 in the direction of the flow of the EGR gas.

The engine 1 includes two cooling systems 30 and 50 which cool the main body and the components of the engine 1. The cooling systems 30 and 50 are each configured as a closed circuit in which cooling water circulates, and the temperature of the cooling water circulating in the cooling system 30 and the temperature of the cooling water circulating in the cooling system 50 can be made to differ from each other. Hereunder, the cooling system 30 in which cooling water of a comparatively low temperature is circulated is referred to as "LT cooling system", and the cooling system 50 in which cooling water of a comparatively high temperature is circulated is referred to as "HT cooling system". Further, cooling water that circulates through a circuit in the LT cooling system 30 is referred to as "LT cooling water", and cooling water that circulates through a circuit in the HT cooling system 50 is referred to as "HT cooling water". In FIG. 1, flow channels (hereunder, referred to as "LT flow channels") for LT cooling water which constitute the LT cooling system 30 are depicted with double lines, and flow channels (hereunder, referred to as "HT flow channels") for HT cooling water which constitute the HT cooling system 50 are depicted with double broken lines. Note that "LT" is an abbreviation of "low temperature" and "HT" is an abbreviation of "high temperature".

The LT cooling system 30 includes a first LT flow channel 32 to a fourth LT flow channel 38 that constitute a circulation circuit for the LT cooling water, and an electric water pump 46 for causing the LT cooling water to circulate. The first LT flow channel 32 passes through the inside of the intercooler 72, the second LT flow channel 34 passes though the intake side in the engine head 2, and the third LT flow channel 36 passes though the bearing 98 of the turbocharger 90. Both ends of each of the first LT flow channel 32 to third LT flow channel 36 are connected in parallel to both ends of the fourth LT flow channel 38. A radiator 40 is disposed in the fourth LT flow channel 38. The fourth LT flow channel 38 forms a circuit in which LT cooling water circulates with each of the first LT flow channel 32 to the third LT flow channel 36. The electric water pump 46 is provided downstream of the radiator 40 in the fourth LT flow channel 38. The discharge rate of the electric water pump 46, that is, the flow rate of LT cooling water circulating in the circuit, can be arbitrarily changed by adjusting the output of a motor.

The LT cooling water that flows through the first LT flow channel 32 exchanges heat inside the intercooler 72 with intake air that passes through the intercooler 72. The second LT flow channel 34 is provided so as to pass through the vicinity of an intake port (preferably so as to surround the intake port) of each cylinder in the engine head 2. The LT cooling water that flows through the second LT flow channel 34 exchanges heat through the engine head 2 with intake air that passes through the intake ports. If the temperature of the LT cooling water is lower than the temperature of the intake air, the intake air is cooled by the heat exchange, while if the temperature of the LT cooling water is higher than the temperature of the intake air, the intake air is heated by the heat exchange. Thus, the temperature of intake air that enters a combustion chamber is adjusted in accordance with the temperature of the LT cooling water by the heat exchange at these sites. The LT cooling water that flows through the third LT flow channel 36 exchanges heat with the bearing 98 of the turbocharger 90, and thereby suppresses overheating of the bearing 98.

Note that, although in the present embodiment the first LT flow channel 32 and the second LT flow channel 34 are connected in parallel, the first LT flow channel 32 and the second LT flow channel 34 may be connected in series. That is, a flow channel may be provided so that LT cooling water that passed through the intercooler 72 passes though the intake side in the engine head 2. Similarly, the third LT flow channel 36 that passes through the bearing 98 also may be connected in series with the first LT flow channel 32 or the second LT flow channel 34.

The HT cooling system 50 includes a first HT flow channel 52 to a sixth HT flow channel 62 that constitute a circulation circuit for HT cooling water, an electric water pump 64 for causing HT cooling water to circulate, and a multifunction valve 66 for controlling the flow of the HT cooling water inside the circulation circuit. The first HT flow channel 52 passes through the exhaust side inside the engine head 2, and the second HT flow channel 54 passes through the inside of the engine block 3. The first HT flow channel 52 and the second HT flow channel 54 are respectively connected to separate intake ports of the multifunction valve 66.

The multifunction valve 66 has two intake ports and four discharge ports. The configuration of the multifunction valve 66 will be described in detail later. The third HT flow channel 56 to the sixth HT flow channel 62 are connected to the four discharge ports of the multifunction valve 66. A radiator 60 is disposed in the third HT flow channel 56. The fourth HT flow channel 58 passes through the inside of the intercooler 72. The fifth HT flow channel 59 passes through the inside of the EGR cooler 104. The sixth HT flow channel 62 bypasses the radiator 60, the intercooler 72 and the EGR cooler 104. The third HT flow channel 56 to sixth HT flow channel 62 are connected to an intake port of the electric water pump 64. The first HT flow channel 52 and the second HT flow channel 54 are connected to a discharge port of the electric water pump 64. Thus, a circuit in which the HT cooling water circulates is formed by the first HT flow channel 52 and the second HT flow channel 54, and by the third HT flow channel 56 to sixth HT flow channel 62. The flow rate of HT cooling water circulating inside the circuits can be arbitrarily changed by adjusting the output of a motor of the electric water pump 64.

Among the flow channels forming the circulation circuits for the HT cooling water, the flow channels in which heat exchange is performed with the main body or components of the engine 1 are the first HT flow channel 52, the second HT flow channel 54, the fourth HT flow channel 58 and the fifth HT flow channel 59. The first HT flow channel 52 is provided so as to pass through the vicinity of the wall surface on the exhaust side of the combustion chamber of each cylinder in the engine head 2. In contrast to the aforementioned second LT flow channel 34 which is locally provided in the vicinity of the intake ports, the first HT flow channel 52 is provided so as to pass through the entire engine head 2 and finally exit to outside of the engine head 2 from the exhaust side. An engine water temperature sensor 68 for measuring the temperature of HT cooling water at an outlet from the engine head 2 is provided in the outlet of the first HT flow channel 52 from the engine head 2. A temperature that is measured by the engine water temperature sensor 68 corresponds to the wall surface temperature on the exhaust side of the combustion chamber. The second HT flow channel 54 constitutes a principal part of a water jacket surrounding the peripheral walls of cylinders formed in the engine block 3 and performs overall cooling with respect to the peripheral walls of the cylinders. The fourth HT flow channel 58 exchanges heat inside the intercooler 72 with intake air that passes through the intercooler 72. In contrast to the aforementioned first LT flow channel 32 which is provided on the downstream side in the flow direction of intake air inside the intercooler 72, the fourth HT flow channel 58 is provided on the upstream side in the flow direction of the intake air inside the intercooler 72. That is, in the intercooler 72, first, heat exchange is performed between the HT cooling water and intake air, and next heat exchange is performed between the LT cooling water and the intake air. The fifth HT flow channel 59 exchanges heat inside the EGR cooler 104 with EGR gas that passes through the EGR cooler 104.

The multifunction valve 66 regulates a ratio between the flow rates of HT cooling water flowing into the two intake ports, that is, a ratio between the HT cooling water flowing through the first HT flow channel 52 and the HT cooling water flowing through the second HT flow channel 54, based on the temperature of the HT cooling water in the circulation circuit (the engine water temperature measured by the engine water temperature sensor 68). For example, at a time of cold starting when the temperature of the HT cooling water is low, the multifunction valve 66 cuts off circulation of HT cooling water through the second HT flow channel 54 that passes through the engine block 3, and allows only the circulation of HT cooling water through the first HT flow channel 52 that passes through the engine head 2. Further, the multifunction valve 66 regulates a ratio between the flow rates of HT cooling water flowing out from the four discharge ports, that is, the ratio between the HT cooling water flowing through the third HT flow channel 56, the HT cooling water flowing through the fourth HT flow channel 58, the HT cooling water flowing through the fifth HT flow channel 59 and the HT cooling water flowing through the sixth HT flow channel 62, based on the temperature of the HT cooling water. For example, at a time of cold starting when the temperature of the HT cooling water is low, the multifunction valve 66 cuts off circulation through the third HT flow channel 56 in which the radiator 60 is disposed, and causes the HT cooling water to circulate through the fourth HT flow channel 58 or sixth HT flow channel 62.

Figure 2:
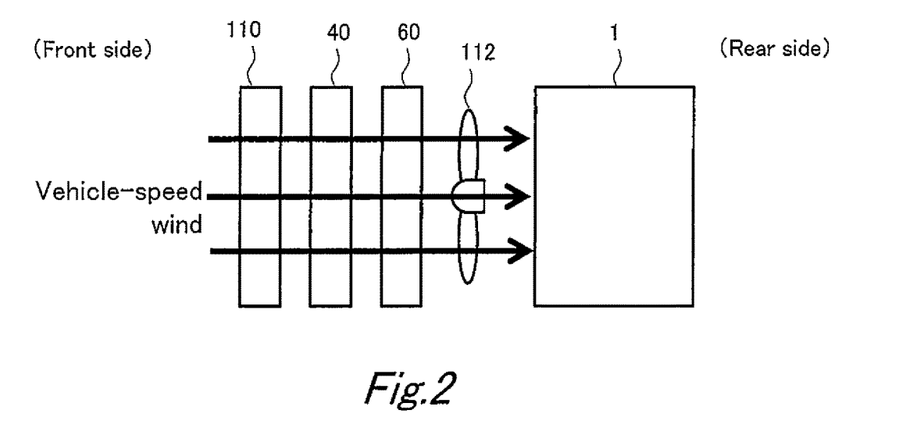
FIG. 2 is a view that illustrates the arrangement of radiators in the internal combustion engine of the embodiment.

FIG. 2 is a view that illustrates the arrangement of the radiators 40 and 60 in the engine 1. As described above, the radiators 40 and 60 are provided in the LT cooling system 30 and the HT cooling system 50, respectively, of the engine 1. As shown in FIG. 2, the radiators 40 and 60 are arranged in series in the direction of the flow of vehicle-speed wind. More specifically, a capacitor 110 of an air conditioner is disposed at a frontmost stage on the front side of the vehicle, and the radiator 40 of the LT cooling system 30 is disposed behind the capacitor 110. The radiator 60 of the HT cooling system 50 is disposed behind the radiator 40. A fan 112 and the engine 1 are disposed in that order behind the radiator 60. By arranging the two radiators 40 and 60 to have such a positional relationship, outside air that exchanged heat with the radiator 40 on the front side is supplied to the radiator 60 on the rear side. Because the temperature of the outside air that passed through the radiator 40 is heated by the heat exchange therewith, depending on the degree to which the outside air was heated, there is a risk that the cooling capacity of the radiator 60 may be insufficient. In the present embodiment, a countermeasure is adopted for suppressing the occurrence of a situation in which the cooling capacity of the radiator 60 is insufficient. The countermeasure will be described in detail later.

The description of the overall configuration of the engine 1 will now be continued with reference again to FIG. 1. The engine 1 includes a control apparatus 120. The control apparatus 120 controls operation of the engine 1 by controlling various apparatuses and actuators included in the engine 1. The control apparatus 120 is an ECU (electronic control unit) having at least one CPU, at least one ROM and at least one RAM. However, the control apparatus 120 may be constituted by a plurality of ECUs. Various functions relating to engine control are realized in the control apparatus 120 by loading a program that is stored in the ROM to the RAM, and executing the program with the CPU.

2. Operation of Cooling Systems

The objects of operation by the control apparatus 120 include the two cooling systems 30 and 50. Operations of the two cooling systems 30 and 50 are performed to control the temperature of intake air that is supplied from the intake passage 70 to the engine head 2 and enters the combustion chambers. That is, the control apparatus 120 operates the cooling systems 30 and 50 by taking the temperature of intake air entering a combustion chamber as a first controlled variable (state quantity to be controlled).

Specifically, when the intake air temperature is a high temperature, such as during turbocharging by the turbocharger 90, the control apparatus 120 operates the cooling systems 30 and 50 so as to cool the intake air by means of the intercooler 72. More specifically, the control apparatus 120 operates the electric water pump 46 of the LT cooling system 30 so as to adjust the flow rate of the LT cooling water that flows through the first LT flow channel 32, and also operates the multifunction valve 66 of the HT cooling system 50 so as to cut off circulation to the fourth HT flow channel 58 of HT cooling water that has a high temperature (HT cooling water which was not cooled at the radiator 60) that flowed out from the engine head 2 or the engine block 3. By these operations, the amount of cooling of the intake air that passes through the intercooler 72 is increased or decreased in accordance with an increase or decrease in the flow rate of the LT cooling water flowing through the first LT flow channel 32, thereby adjusting the temperature of the intake air. Note that, when passing through the intake port in the engine head 2, the intake air that was cooled at the intercooler 72 is also cooled by heat exchange with LT cooling water flowing through the second LT flow channel 34.

Conversely, when the intake air temperature is low, such as at a time of cold starting, the control apparatus 120 operates the multifunction valve 66 of the HT cooling system 50 so as to allow circulation of HT cooling water to the fourth HT flow channel 58. Intake air that passes through the intercooler 72 is heated by the HT cooling water having a high temperature that flows through the fourth FIT flow channel 58, and intake air whose temperature was increased by being heated in that manner flows out from the intercooler 72. Further, as operation with respect to the LT cooling system 30, the control apparatus 120 stops the electric water pump 46 to cut off the flow of LT cooling water (LT cooling water having a low temperature that was cooled at the radiator 40) to the first LT flow channel 32. By these operations, the amount of heating of the intake air that passes through the intercooler 72 is increased or decreased in accordance with an increase or decrease in the flow rate of the HT cooling water flowing through the fourth HT flow channel 58, thereby adjusting the temperature of the intake air.

As described in the foregoing, in the engine 1, operation of the cooling systems 30 and 50 is performed by taking the temperature of intake air entering the combustion chambers as a controlled variable. This operation relates to operation with respect to an "intake air temperature adjustment apparatus" described in claim 1 of the present application. In this embodiment, an apparatus constituted by the intercooler 72 and the LT cooling system 30 or the HT cooling system 50 corresponds to the "intake air temperature adjustment apparatus" described in claim 1. More specifically, when the intake air temperature is high, such during turbocharging, in the intercooler 72 the intake air is cooled by heat exchange with LT cooling water supplied by the LT cooling system 30. Hence, in such a case, an apparatus constituted by the intercooler 72 and the LT cooling system 30 corresponds to the "intake air temperature adjustment apparatus" described in claim 1. On the other hand, when the intake air temperature is low, such as at a time of cold starting, in the intercooler 72 the intake air is heated by heat exchange with HT cooling water supplied by the HT cooling system 50. Hence, in such a case, an apparatus constituted by the intercooler 72 and the HT cooling system 50 corresponds to the "intake air temperature adjustment apparatus" described in claim 1.

Further, the control apparatus 120 also performs operation of the HT cooling system 50 taking the temperature of cooling water flowing through the exhaust side of the engine head 2 (hereunder, this temperature is also referred to as "engine water temperature") as a second controlled variable. The temperature of the cooling water flowing through the exhaust side of the engine head 2 is represented by a temperature measured by the engine water temperature sensor 68 provided at the outlet of the engine head 2. If there is a difference between the temperature measured by the engine water temperature sensor 68 and a target temperature, the control apparatus 120 operates the electric water pump 64 to adjust the flow rate of HT cooling water flowing through the first HT flow channel 52, and also operates the multifunction valve 66 to adjust the ratio of the HT cooling water that flows to the third HT flow channel 56 and is cooled at the radiator 60. By these operations, the temperature of cooling water that flows through the exhaust side of the engine head 2 is adjusted in accordance with an increase or decrease in the flow rate of the HT cooling water flowing through the first HT flow channel 52 or in accordance with an increase and decrease in the ratio of HT cooling water that is cooled at the radiator 60.

As described in the foregoing, in the engine 1, operation of the HT cooling system 50 is performed by taking the temperature of cooling water that flows through the exhaust side of the engine head 2 as a controlled variable. This operation relates to operation with respect to an "engine water temperature adjustment apparatus" described in claim 2 of the present application. In this embodiment, the HT cooling system 50 corresponds to the "engine water temperature adjustment apparatus" described in claim 2.

3. Configuration Around Combustion Chamber

Figure 3:
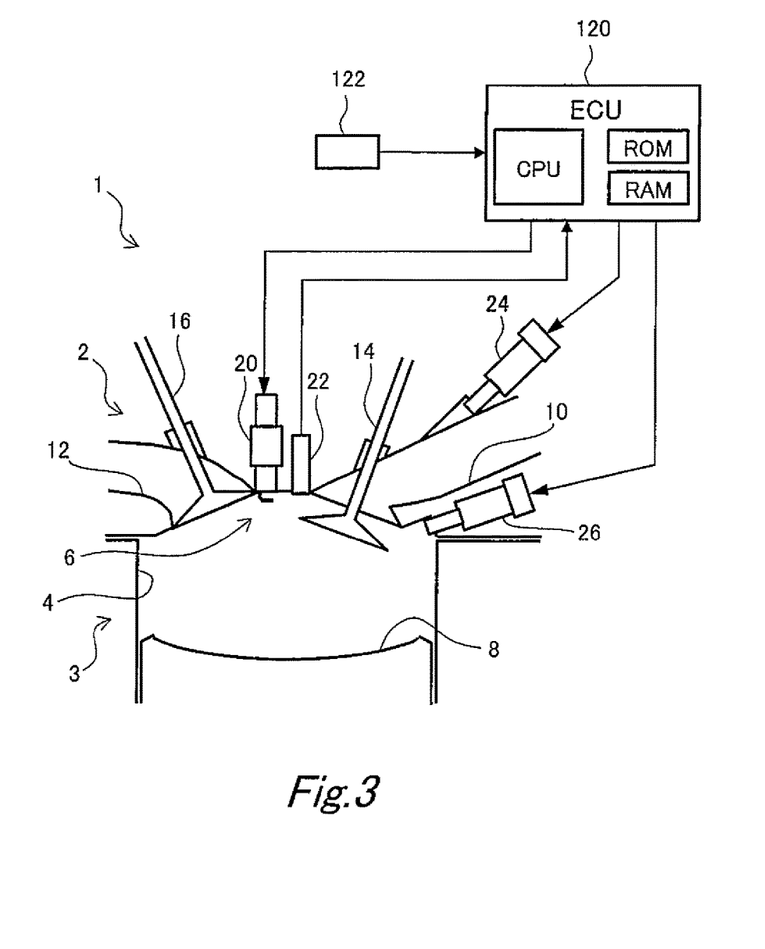
FIG. 3 is a view that illustrates the configuration around a combustion chamber of the internal combustion engine of the embodiment.

Next, the configuration around a combustion chamber of the engine 1 will be described using FIG. 3. In FIG. 3, components constituting the engine 1 are illustrated in a manner in which the components are projected onto a single plane that is perpendicular to a crankshaft. The engine 1 is a spark-ignition multi-cylinder engine that has a plurality of cylinders 4. The number and arrangement of the cylinders 4 is not limited. In each of the cylinders 4 of the engine block 3, a piston 8 is arranged that reciprocates in the axial direction thereof. A pent-roof shaped combustion chamber 6 that is an upper space of the cylinder 4 is formed on the underside of the engine head 2.

An intake port 10 and an exhaust port 12 that communicate with the combustion chamber 6 are formed in the engine head 2. An intake valve 14 is provided at an opening portion that allows the intake port 10 to communicate with the combustion chamber 6. An exhaust valve 16 is provided at an opening portion that allows the exhaust port 12 to communicate with the combustion chamber 6. Although not illustrated in the drawing, the intake port 10 bifurcates partway along its length in the direction from an inlet formed in a side face of the engine head 2 towards the opening portion that communicates with the combustion chamber 6. A port injection valve 24 that injects fuel into the intake port 10 is provided upstream of a portion at which the intake port 10 bifurcates. At a lower part of the intake port 10 which is a location between the bifurcating parts of the intake port 10, an in-cylinder injection valve 26 that injects fuel into the combustion chamber 6 is provided so that the tip thereof faces the combustion chamber 6. Further, a spark plug 20 and a combustion pressure sensor 22 for measuring a combustion pressure are provided in the vicinity of the top portion of the combustion chamber 6.

The engine 1 is an engine that is capable of switching between operation in a lean mode and operation in a stoichiometric mode. In the lean mode, operation is performed according to an air-fuel ratio that is lean in fuel (for example, an air-fuel ratio of around 25), that is operation using lean combustion, by port injection with which an air-fuel mixture having a high degree of homogeneity is obtained, or by a combination of port injection and in-cylinder injection that primarily uses the port injection. More specifically, lean combustion that is realized with the engine 1 is not stratified lean combustion which forms an air-fuel mixture layer with a high fuel concentration at the periphery of the spark plug 20, but rather is homogeneous lean combustion which distributes an air-fuel mixture with a homogeneous fuel concentration throughout the combustion chamber 6. Further, in the lean mode, introduction of EGR gas is not performed by the EGR apparatus 100, and lean combustion is performed that uses only fresh air. In the stoichiometric mode, operation according to the theoretical air-fuel ratio is performed, that is, operation is performed under stoichiometric combustion, by in-cylinder injection or by a combination of port injection and in-cylinder injection that primarily uses the in-cylinder injection. However, the term "operation according to the theoretical air-fuel ratio" does not mean that the air-fuel ratio under which operation is performed is necessarily always the exact theoretical air-fuel ratio. In the present description, operation in which the operational air-fuel ratio deviates somewhat to the rich side or lean side relative to the theoretical air-fuel ratio and operation in which the operational air-fuel ratio fluctuates with small amplitude around the theoretical air-fuel ratio are included in the meaning of the term "operation according to the theoretical air-fuel ratio". The stoichiometric mode is selected in an operating region in which the load is high relative to an operating region in which the lean mode is selected. Further, in the stoichiometric mode of the present embodiment, EGR is executed by the EGR apparatus 100. Therefore, in the following description, the stoichiometric mode in which EGR is executed is, in particular, referred to as "stoichiometric EGR mode" to distinguish the mode from the lean mode in which EGR is not executed.

Operations of the apparatuses and actuators for realizing the lean mode and the stoichiometric EGR mode are performed by the control apparatus 120. Combustion pressure data obtained by the combustion pressure sensor 22 is taken in by the control apparatus 120. The combustion pressure data is used together with crank angle signals taken in from a crank angle sensor 122 to perform fuel injection amount control and ignition timing control that are described next. Note that, when the control apparatus 120 is constituted by a plurality of ECUs, an ECU that performs fuel injection amount control or ignition timing control may be a separate ECU from an ECU that performs intake air temperature control or engine water temperature control that are described above.

4. Fuel Injection Amount Control and Ignition Timing Control Based on Combustion Pressure Data During operation in the lean mode, the control apparatus 120 performs fuel injection amount control and ignition timing control based on combustion pressure data obtained by the combustion pressure sensor 22. Hereunder, the details of the control are described using FIG. 4.

Figure 4:
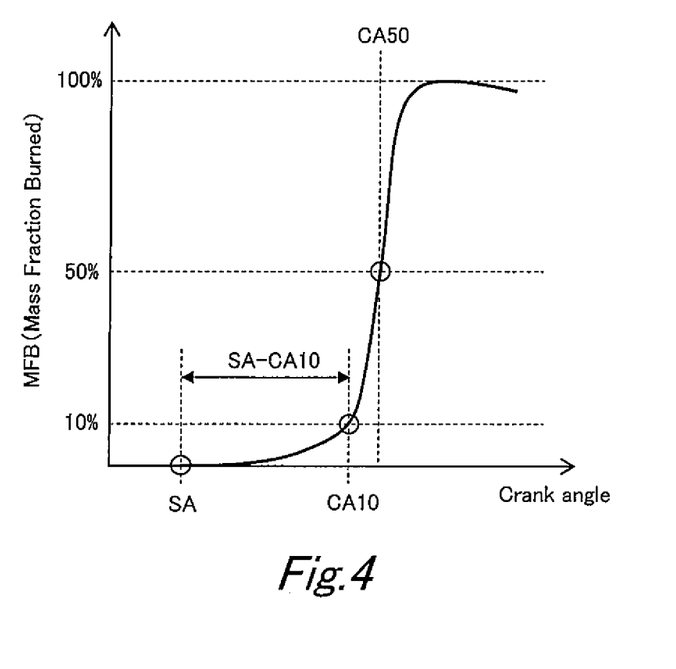
FIG. 4 is a view for describing fuel injection amount control and ignition timing control of the embodiment.

The control apparatus 120 calculates a heat release quantity Q in a cylinder at an arbitrary crank angle θ in accordance with expression (1) using in-cylinder pressure data obtained by the combustion pressure sensor 22. Where, in expression (1), P represents an in-cylinder pressure, V represents an in-cylinder volume and κ represents a ratio of specific heat of in-cylinder gas. Further, $P_0$ and $V_0$ represent an in-cylinder pressure and an in-cylinder volume, respectively, at a calculation starting point $\theta_0$ (a predetermined crank angle during a compression stroke that is defined so as to include a margin with respect to an assumed combustion starting point).

$$Q = \int P dV + \frac{1}{\kappa - 1}(PV - P_0 V_0) \quad (1)$$

After the heat release quantity Q has been calculated at each crank angle θ of a predetermined crank angle period that includes a combustion period, next a mass fraction burned (hereunder, referred to as "MFB") at an arbitrary crank angle θ is calculated in accordance with expression (2). Where, in expression (2), $\theta_{sta}$ represents a combustion starting point and $\theta_{fin}$ represents a combustion ending point.

$$MFB = \frac{Q(\theta) - Q(\theta_{Sta})}{Q(\theta_{fin}) - Q(\theta_{sta})} \quad (2)$$

FIG. 4 is a view that illustrates a waveform of MFB with respect to the crank angles calculated according to the above described expression (2). A crank angle period until a crank angle CA10 at which MFB becomes 10% (hereunder, this period is referred to as "SA-CA10") after ignition of an air-fuel mixture is performed at an ignition timing SA is a parameter that represents an ignition delay, and it is known that there is a high correlation between SA-CA10 and the air-fuel ratio of the air-fuel mixture that is combusted (particularly, a limit air-fuel ratio at which lean combustion is possible). If the fuel injection amount is subjected to feedback control so that SA-CA10 becomes a target value, the air-fuel ratio can be naturally brought close to the target air-fuel ratio (lean limit air-fuel ratio). In the fuel injection amount control by the control apparatus 120, the actual SA-CA10 is calculated based on the MFB waveform, and the fuel injection amount is corrected based on a difference between a target SA-CA10 and the actual SA-CA10. Note that, because the time period per crank angle changes when the engine speed changes, preferably the target SA-CA10 is set in accordance with the engine speed at least.

A crank angle CA50 at a time at which the MFB becomes 50% corresponds to the combustion center of gravity position. The crank angle CA50 changes depending on the ignition timing SA. If CA50 matches the combustion center of gravity position at a time that the torque that is realized is the maximum torque, it can be said that the ignition timing SA at such time is the MBT. In the ignition timing control by the control apparatus 120, the actual CA50 is calculated based on the MFB waveform, and the basic ignition timing is corrected based on a difference between the target CA50 and the actual CA50. The target CA50 is also preferably set in accordance with at least the engine speed.

As described in the foregoing, according to the present embodiment, SA-CA10 and CA50 are calculated based on combustion pressure data obtained by the combustion pressure sensor 22, and fuel injection amount control is performed based on SA-CA10, and ignition timing control is performed based on CA50. Note that, although fuel injection amount control based on SA-CA10 can be performed regardless of the operation mode, in the present embodiment the fuel injection amount control based on SA-CA10 is performed during operation in the lean mode. During operation in the stoichiometric EGR mode, air-fuel ratio feedback control is performed based on the output of an unshown air-fuel ratio sensor or oxygen concentration sensor.

In this connection, fuel injection amount control based on SA-CA10 is based on the premise that there is a strong correlation between SA-CA10 and the air-fuel ratio. However, research carried out by the inventors of the present application revealed that the temperature of intake air that enters the combustion chamber 6 is a parameter that has a particularly strong influence on the relation between SA-CA10 and the air-fuel ratio among the various parameters relating to combustion.

Figure 5:
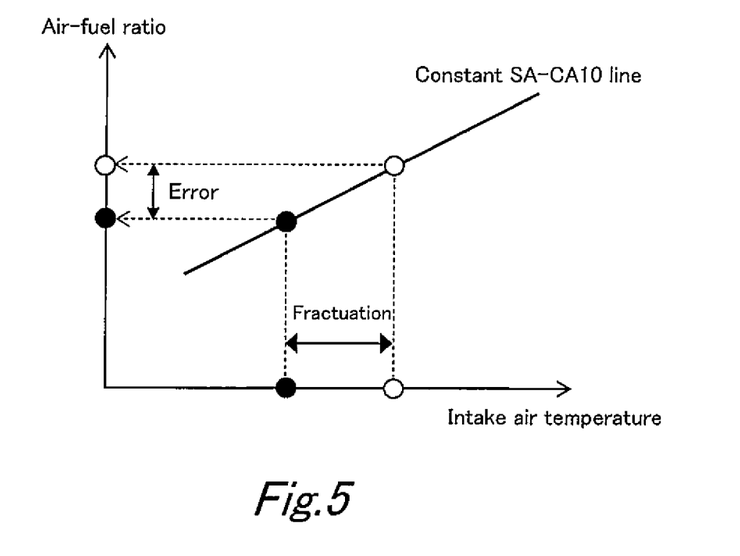
FIG. 5 is a view illustrating the influence of intake air temperature on air-fuel ratio caused by the fuel injection amount control based on SA-CA10.

FIG. 5 is a view illustrating the manner in which the air-fuel ratio changes depending on the temperature of intake air that enters the combustion chamber 6 when the fuel injection amount is controlled so that SA-CA10 is constant. As illustrated in FIG. 5, when the temperature of intake air is comparatively low the air-fuel ratio is controlled to a comparatively small value (that is, a fuel-rich value), and when the temperature of intake air is comparatively high the air-fuel ratio is controlled to a comparatively large value (that is, a fuel-lean value). That is, an error arises between the target air-fuel ratio and the actual air-fuel ratio according to fluctuations in the temperature of intake air.

Therefore, in the intake air temperature control according to the present embodiment, operation of the cooling systems 30 and 50 is performed so as to actively make the temperature of intake air that enters the combustion chamber 6 that is a controlled variable a constant temperature.

5. Setting of Intake Air Temperature and Engine Water Temperature

It is required to make the intake air temperature constant in order to ensure the accuracy of fuel injection amount control based on SA-CA10. However, since the intake air temperature is itself a parameter that influences combustion, it is not the case that the intake air temperature that is adopted as a target may be any temperature. Further, the engine water temperature (temperature of cooling water that flows through the exhaust side of the engine head 2) that is a controlled variable of the engine water temperature control is also a parameter that influences combustion. Hence, it is preferable that there are no fluctuations in the engine water temperature also, similarly to the intake air temperature.

Tasks that exist with respect to the lean mode and the stoichiometric EGR mode when considering the setting of the intake air temperature and engine water temperature that are to be adopted as targets are summarized and described hereunder.

At least the following three tasks exist with respect to the lean mode. The first task is to improve the robustness of combustion. This task arises due to the fact that because the fuel concentration in the air-fuel mixture is low overall in homogeneous lean combustion, in comparison to stoichiometric combustion or stratified lean combustion, many constraints exist with regard to disturbance in terms of maintaining combustion. The second task is to reduce the generation of unburned hydrocarbons. This task arises due to the fact that because the combustion temperature in lean combustion is low compared to stoichiometric combustion, unburned hydrocarbons are liable to be generated from the quench area of the combustion chamber 6. The third task is to increase the upper-limit air amount. To further improve fuel consumption performance, it is required to increase the upper-limit air amount and expand the operation region of the lean mode to the high load side.

At least the following three tasks exist with respect to the stoichiometric EGR mode. The first task is to improve the robustness of combustion. This task arises due to the fact that, in the stoichiometric EGR mode, if a large amount of EGR gas is introduced to improve fuel consumption, combustion is liable to become unstable since there are fluctuations in the EGR amount that is introduced between each cycle. The second task is to suppress the generation of condensed water caused by condensation of water vapor that is contained in EGR gas. This task arises due to the fact that because sulfur components and hydrocarbon components are contained in EGR gas, condensed water acidifies if these components melt in the condensed water, and there is a concern that the condensed water will corrode or deteriorate the engine 1. The third task is to suppress the occurrence of knocking at the time of a high load. This task arises due to the fact that when the load increases, the compression-end temperature increases and knocking is liable to occur.

As the result of studies conducted while taking the above tasks into consideration, in the present embodiment a configuration is adopted in which the respective target values for the intake air temperature (temperature of intake air entering the combustion chamber 6) and for the engine water temperature (temperature of cooling water flowing through the exhaust side of the engine head 2) in the lean mode and the stoichiometric EGR mode, respectively, are set as described hereunder.

First, setting of a target value of the intake air temperature will be described. Among the above described tasks, the tasks that particularly relate to the intake air temperature in the stoichiometric EGR mode are the first task and second task for the stoichiometric EGR mode, and the tasks that particularly relate to the intake air temperature in the lean mode are the first task and third task for the lean mode. The target value for the intake air temperature in each mode is set to an optimal intake air temperature for comprehensively achieving these tasks.

The optimal intake air temperature (first temperature) of the stoichiometric EGR mode in this embodiment is 45° C. This temperature is a temperature that corresponds to a dew-point temperature in standard operating conditions (these operating conditions include air pressure, outside air temperature, humidity, EGR rate and the like). In the stoichiometric EGR mode the two cooling systems 30 and 50 are operated so that the intake air temperature that is measured by the intake-air temperature sensor 76 is maintained at 45° C. that is the optimal intake air temperature.

The higher that the intake air temperature is in the stoichiometric EGR mode, the better it is in terms of reducing a risk that condensed water will arise. However, the intake efficiency decreases as the intake air temperature increases. By controlling the intake air temperature to the dew-point temperature as described above, the risk of condensed water arising can be suppressed while suppressing a decrease in the intake efficiency to a minimum. However, although the dew-point temperature changes depending on the operating conditions, the target value of the intake air temperature in the stoichiometric EGR mode is fixed to the dew-point temperature under standard operating conditions. That is, even if the dew-point temperature changes, the intake air temperature is not changed in accordance with the dew-point temperature. The reason is that, when a large amount of EGR gas is introduced in the stoichiometric EGR mode and fluctuations in the EGR amount between each cycle affect combustion, if there are also fluctuations in the intake air temperature there is a risk that this will lead to unstable combustion. In short, a configuration is adopted in which the intake air temperature is maintained at a constant temperature even in the stoichiometric EGR mode in order to improve the robustness of combustion. Note that, although preferably the intake air temperature is maintained at exactly the optimal intake air temperature, an error of a certain amount (for example, around 1° C.) with respect to the optimal intake air temperature may be allowed. That is, a configuration may be adopted so as to perform adjustment of the intake air temperature so that the intake air temperature enters a temperature region (first temperature region) defined by an error range that is centered on the optimal intake air temperature.

On the other hand, the optimal intake air temperature in the lean mode is a lower temperature than the optimal intake air temperature in the stoichiometric EGR mode. In the lean mode, in which recirculation is not performed, a decrease in combustion stability due to fluctuations in the EGR amount between cycles does not arise. Therefore, intake air of a comparatively low temperature relative to the stoichiometric EGR mode can be supplied into the combustion chambers. In the present embodiment, the optimal intake air temperature (second temperature) in the lean mode is 35° C. In the lean mode, the two cooling systems 30 and 50 are operated so that the intake air temperature measured by the intake-air temperature sensor 76 is maintained at 35° C. that is the optimal intake air temperature.

By maintaining the intake air temperature at the optimal intake air temperature, the accuracy of fuel injection amount control that is based on SA-CA10 can be improved and a deviation in the air-fuel ratio with respect to the target air-fuel ratio can be suppressed. At the same time, the operating region in which operation is performed in the lean mode can be expanded to the high load side by an increase in the upper-limit air amount that is achieved by improving the intake efficiency. Note that, although preferably the intake air temperature is maintained at exactly the optimal intake air temperature, an error of a certain amount (for example, around 1° C.) with respect to the optimal intake air temperature may be allowed. That is, a configuration may be adopted so as to perform adjustment of the intake air temperature so that the intake air temperature enters a temperature region (second temperature region) defined by an error range that is centered on the optimal intake air temperature.

Next, setting of a target value of the engine water temperature will be described. Among the above described tasks, the task that particularly relates to the engine water temperature in the stoichiometric EGR mode is the third task for the stoichiometric EGR mode, and the task that particularly relates to the engine water temperature in the lean mode is the second task for the lean mode. The target value for the engine water temperature in each mode is set to an optimal engine water temperature for comprehensively achieving these tasks.

The optimal engine water temperature (fourth temperature) in the lean mode in this embodiment is 95° C. In the lean mode, the HT cooling system 50 is operated so that the engine water temperature measured by the engine water temperature sensor 68 is maintained at 95° C. that is the optimal engine water temperature.

Since the wall surface temperature of the combustion chamber 6, particularly the wall surface temperature on the exhaust side, can be raised by maintaining the engine water temperature at the optimal engine water temperature, unburned hydrocarbons that are generated from the quench area of the combustion chamber 6 can be reduced. In comparison to stoichiometric combustion, the combustion temperature is low and the exhaust gas temperature does not become high in lean combustion, and consequently it is difficult for a purification function of a catalyst to be exerted adequately. Therefore, it is required to reduce the unburned hydrocarbons themselves that are emitted from the engine 1. Note that, although preferably the engine water temperature is maintained at exactly the optimal engine water temperature, an error of a certain amount (for example, around 1° C.) with respect to the optimal engine water temperature may be allowed. That is, a configuration may be adopted so as to perform adjustment of the engine water temperature so that the engine water temperature enters a temperature region (fourth temperature region) defined by an error range that is centered on the optimal engine water temperature.

On the other hand, although a temperature width exists with respect to the optimal engine water temperature in the stoichiometric EGR mode, the upper limit temperature thereof is a lower temperature than the optimal engine water temperature in the lean mode. In the stoichiometric EGR mode, because the combustion concentration is high and the exhaust gas temperature is also high, even if unburned hydrocarbons are generated from the quench area, the unburned hydrocarbons can be purified by the catalyst which functions adequately. Therefore, cooling water of a comparatively low temperature relative to the lean mode can be caused to flow to the exhaust side of the engine head. The optimal engine water temperature in the stoichiometric EGR mode in the present embodiment is a temperature within a temperature range (third temperature region) that takes 88° C. as an upper limit temperature (third temperature), that is, a temperature equal to or less than 88° C. However, the term "temperature equal to or less than 88° C." does not mean that a temperature which is lower than 88° C. by any amount is allowed, but rather means that although 88° C. is preferable, a temperature that is lower than 88° C. to a certain extent is also allowed. In the lean mode, the HT cooling system 50 is operated so that the engine water temperature measured by the engine water temperature sensor 68 is maintained at a temperature that is equal to or less than 88° C.

The reason that the engine water temperature in the stoichiometric EGR mode is made lower than the engine water temperature in the lean mode is to inhibit the occurrence of knocking. Although unburned hydrocarbons that are generated from the quench area of the combustion chamber 6 are liable to increase when the engine water temperature is lowered, the unburned hydrocarbons can be purified by the adequately functioning catalyst which receives a supply of exhaust gas having a high temperature as the result of undergoing stoichiometric combustion. Note that, although a temperature width is provided with respect to the optimal engine water temperature in the stoichiometric EGR mode, from the viewpoint of improving the robustness of combustion it is preferable to maintain the engine water temperature at a constant temperature.

In this connection, as described in the foregoing, in the present embodiment the radiator 40 of the LT cooling system 30 is disposed on the upstream side in the direction of the flow of vehicle-speed wind, and the radiator 60 of the HT cooling system 50 is disposed on the downstream side thereof (side FIG. 2). According to this arrangement, at a time of a high load when there is a large amount of heat radiation from the two radiators 40 and 60, there is a risk that the cooling capacity of the radiator 60 disposed on the downstream side will be insufficient. Specifically, in the stoichiometric EGR mode when the load is a high load, there is a risk that even if the intake air temperature can be maintained at 45° C., it will be difficult to maintain the engine water temperature at a temperature that is equal to or less than 88° C.

In such a case, in the present embodiment, the cooling systems 30 and 50 are operated so as to allow the intake air temperature to be higher than 45° C. that is the optimal intake air temperature and to prioritize maintaining the engine water temperature at a temperature that is equal to or less than 88° C. That is, the proportion of the LT cooling water passing through the radiator 40 in the LT cooling system 30 is lowered, and the amount of heat exchange between the LT cooling water and outside air passing through the radiator 40 is decreased. By this means, although the intake air temperature becomes higher than 45° C., since an increase in the temperature of the outside air that passed through the radiator 40 is suppressed, the heat quantity that is absorbed from the HT cooling water that flows through the radiator 60 when the outside air passes through the radiator 60 on the downstream side of the radiator 40 can be increased. By operating the cooling systems 30 and 50 in this way, even in a high load region in which the heat radiation from the engine 1 increases, the temperature of cooling water flowing through the exhaust side of the engine head 2 can be suppressed to a temperature that is equal to or less than 88° C., and an increase in the wall surface temperature on the exhaust side of the combustion chamber 6 can be suppressed to suppress the occurrence of knocking.

Figure 6:
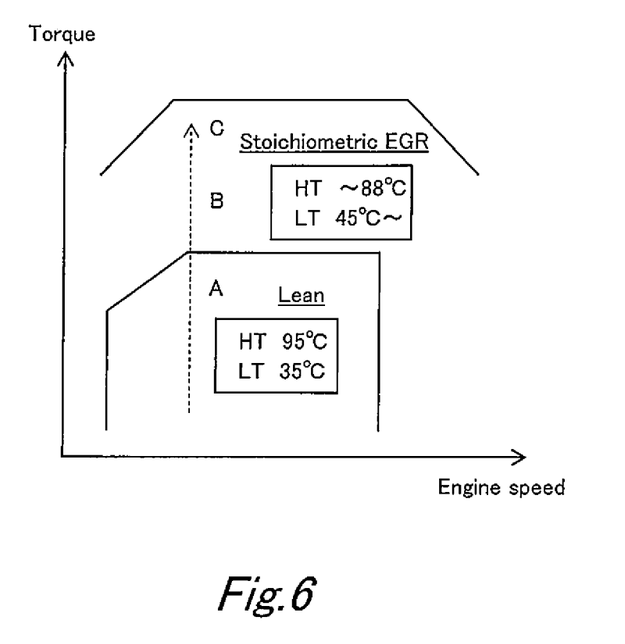
FIG. 6 is a view illustrating an image of a map in which respective target values for intake air temperature and engine water temperature are associated with engine speed and torque.

The foregoing is a description that relates to the respective target values for the intake air temperature and the engine water temperature in each of the lean mode and the stoichiometric EGR mode. The respective target values for the intake air temperature and the engine water temperature which are set as described above are stored in association with the engine speed and torque in a map that is stored in the ROM of the control apparatus 120. FIG. 6 is a view illustrating an image of a map in which respective target values for the intake air temperature and the engine water temperature are associated with the engine speed and torque. In FIG. 6, the temperatures represented by "HT" are target values for the engine water temperature, and the temperatures represented by "LT" are target values for the intake air temperature. The various kinds of control of the engine 1 including the intake air temperature control and the engine water temperature control are performed according to operating regions that are set on a two-dimensional plane that adopts the engine speed and torque as axes.

In FIG. 6, a lean region in which operation according to the lean mode is performed, and a stoichiometric EGR region in which operation according to the stoichiometric EGR mode is performed are set as operating regions of the engine 1. In the lean region, as described above, the target value of the intake air temperature is set to 35° C. and the target value of the engine water temperature is set to 95° C. In the stoichiometric EGR region, the target value of the intake air temperature is set to 45° C. or more and the target value of the engine water temperature is set to 88° C. or less. The term "target value of the intake air temperature is set to 45° C. or more" means that although normally 45° C. is the target value, the intake air temperature is allowed to become higher than 45° C. in a high load region.

Figure 7:
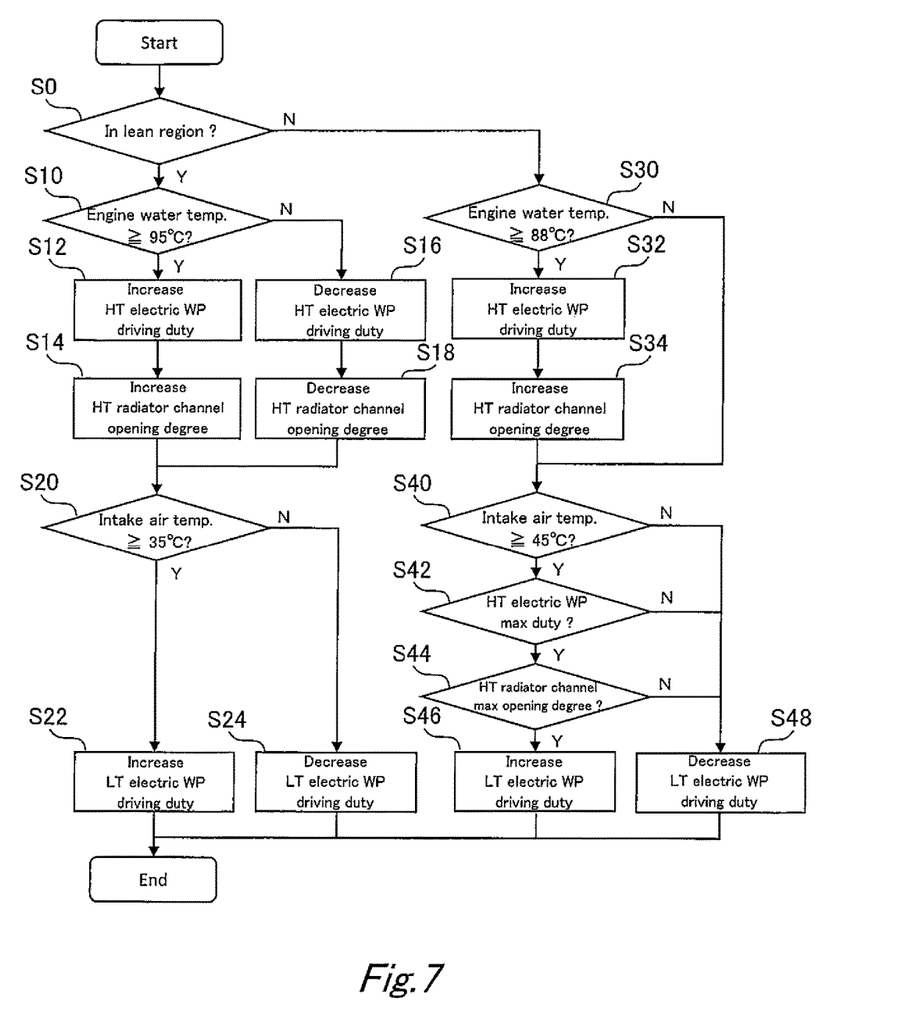
FIG. 7 is a flowchart that illustrates a control flow of intake air temperature control and engine water temperature control of the embodiment.

6. Details of Intake Air Temperature Control and Engine Water Temperature Control The intake air temperature control and engine water temperature control are executed based on respective target values for the intake air temperature and the engine water temperature that are set as described above. FIG. 7 is a flowchart that illustrates the control flow of intake air temperature control and engine water temperature control by the control apparatus 120. The control apparatus 120 reads out a program represented by this control flow from the ROM, and repeatedly executes the control flow at predetermined control periods that correspond to the clock speed of the CPU. However, the control flow described here corresponds to a program that is executed when the engine 1 is in a warm state and the intake air temperature is a high temperature as the result of turbocharging.

First, in step S0, the control apparatus 120 determines whether or not an operating point of the engine 1 that is defined by the engine speed and the target torque is in the lean region. If the operating point of the engine 1 is in the lean region, the control flow proceeds to step S10.

In step S10, the control apparatus 120 determines whether or not the engine water temperature that is measured by the engine water temperature sensor 68 is 95° C. or more. If the engine water temperature is 95° C. or more, the control apparatus 120 executes the processing in steps S12 and S14. In step S12, the control apparatus 120 increases the driving duty of the electric water pump 64 of the HT cooling system 50 to thereby increase the flow rate of HT cooling water flowing through the exhaust side of the engine head 2. In step S14, the control apparatus 120 increases the opening degree of the flow channel that communicates with the radiator 60 of the HT cooling system 50 (opening degree of the third HT flow channel 56 of the multifunction valve 66) to thereby increase the flow rate of the HT cooling water that passes through the radiator 60. The engine water temperature is lowered by these processes. Note that, in the flowchart, the electric water pump of the HT cooling system 50 is described as "HT electric WP", and the opening degree of the third HT flow channel 56 of the multifunction valve 66 is described as "HT radiator flow-channel opening degree".

If the engine water temperature is less than 95° C., the control apparatus 120 executes the processing in steps S16 and S18. In step S16, the control apparatus 120 decreases the driving duty of the electric water pump 64 of the HT cooling system 50, to thereby decrease the flow rate of the HT cooling water flowing through the exhaust side of the engine head 2. In step S18, the control apparatus 120 decreases the opening degree of the flow channel that communicates with the radiator 60 of the HT cooling system 50 (opening degree of the third HT flow channel 56 of the multifunction valve 66) to thereby decrease the flow rate of the HT cooling water that passes through the radiator 60. The engine water temperature is raised by these processes.

By performing the processing in the above steps S10 to S18, the engine water temperature when the operating point of the engine 1 is in the lean region converges on 95° C. and is maintained at that temperature.

If the operating point of the engine 1 is in the lean region, next the control flow proceeds to step S20.

In step S20, the control apparatus 120 determines whether or not the intake air temperature measured by the intake-air temperature sensor 76 is 35° C. or higher. If the intake air temperature is 35° C. or higher, the control apparatus 120 executes the processing in step S22. In step S22, the control apparatus 120 increases the driving duty of the electric water pump 46 of the LT cooling system 30 to thereby increase the flow rate of LT cooling water flowing through the intercooler 72. The intake air temperature is lowered by this process. Note that, in the flowchart, the electric water pump of the LT cooling system 30 is described as "LT electric WP".

If the intake air temperature is less than 35° C., the control apparatus 120 executes the processing in step S24. In step S24, the control apparatus 120 decreases the driving duty of the electric water pump 46 of the LT cooling system 30, to thereby decrease the flow rate of the LT cooling water flowing through the intercooler 72. The intake air temperature is raised by this process.

By performing the processing in the above steps S20 to S24, the intake air temperature when the operating point of the engine 1 is in the lean region converges on 35° C. and is maintained at that temperature.

On the other hand, if the operating point of the engine 1 is in the stoichiometric EGR region and not the lean region, the control flow proceeds to step S30.

In step S30, the control apparatus 120 determines whether or not the engine water temperature measured by the engine water temperature sensor 68 is 88° C. or higher. If the engine water temperature is 88° C. or higher, the control apparatus 120 executes the processing in steps S32 and S34. In step S32, the control apparatus 120 increases the driving duty of the electric water pump 64 of the HT cooling system 50 to thereby increase the flow rate of HT cooling water flowing through the exhaust side of the engine head 2. In step S34, the control apparatus 120 increases the opening degree of the flow channel that communicates with the radiator 60 of the HT cooling system 50 (opening degree of the third HT flow channel 56 of the multifunction valve 66) to thereby increase the flow rate of the HT cooling water that passes through the radiator 60. The engine water temperature is lowered by these processes.

If the engine water temperature is less than 88° C., the control apparatus 120 maintains the current control state and does not actively change the engine water temperature. That is, the control apparatus 120 maintains the current driving duty of the electric water pump 64 of the HT cooling system 50, and also maintains the current opening degree of the flow channel that communicates with the radiator 60 of the HT cooling system 50 (opening degree of the third HT flow channel 56 of the multifunction valve 66).

By performing the above described processing in steps S30 to S34, the engine water temperature when the operating point of the engine 1 is in the stoichiometric EGR region is maintained at a temperature that is equal to or less than 88° C. However, as described later, depending on the control state of the electric water pump 64 or the multifunction valve 66, in some cases additional processing is required to maintain the engine water temperature at a temperature that is equal to or less than 88° C.

If the operating point of the engine 1 is in the stoichiometric EGR region, next the control flow proceeds to step S40.

In step S40, the control apparatus 120 determines whether or not the intake air temperature measured by the intake-air temperature sensor 76 is 45° C. or higher. If the intake air temperature is 45° C. or higher, in step S42, the control apparatus 120 checks whether the driving duty of the electric water pump 64 of the HT cooling system 50 is the maximum driving duty. If it is confirmed that the driving duty of the electric water pump 64 is not the maximum driving duty, in step S44, the control apparatus 120 further checks whether the opening degree of the flow channel that communicates with the radiator 60 of the HT cooling system 50 (opening degree of the third HT flow channel 56 of the multifunction valve 66) is the maximum opening degree. If it is confirmed that the opening degree is not the maximum opening degree, the control apparatus 120 executes the processing in step S46. In step S46, the control apparatus 120 increases the driving duty of the electric water pump 46 of the LT cooling system 30 to thereby increase the flow rate of the LT cooling water flowing through the intercooler 72. The intake air temperature is lowered by this process.

When the driving duty of the electric water pump 64 is the maximum driving duty or the opening degree of the flow channel communicating with the radiator 60 is the maximum opening degree, the flow rate of the HT cooling water passing through the radiator 60 has already reached the maximum value thereof and cannot be increased further. Therefore, there is a possibility that the state is one in which the engine water temperature exceeds 88° C. In such a case, the control apparatus 120 executes the processing in step S48. In step S48, the control apparatus 120 decreases the driving duty of the electric water pump 46 of the LT cooling system 30 to thereby reduce the flow rate of the LT cooling water flowing through the radiator 40. The heat radiation amount of the radiator 40 is reduced by this process, and the heat radiation amount of the radiator 60 is increased by a corresponding amount, and hence the engine water temperature decreases. However, the intake air temperature increases to exceed 45° C. as a result of the heat radiation amount of the radiator 40 decreasing.

If the intake air temperature is less than 45° C., the control apparatus 120 executes the processing in step S48. In step S48, the control apparatus 120 decreases the driving duty of the electric water pump 46 of the LT cooling system 30, to thereby decrease the flow rate of the LT cooling water flowing through the intercooler 72. The intake air temperature is raised by this process.

By performing the processing in the above steps S40 to S48, the intake air temperature when the operating point of the engine 1 is in the stoichiometric EGR region converges on 45° C. and is maintained at that temperature. However, when the driving duty of the electric water pump 64 is the maximum driving duty or the opening degree of the flow channel communicating with the radiator 60 is the maximum opening degree, maintaining the engine water temperature at a temperature that is equal to or less than 88° C. is prioritized over maintaining the intake air temperature at 45° C.

Figure 8:
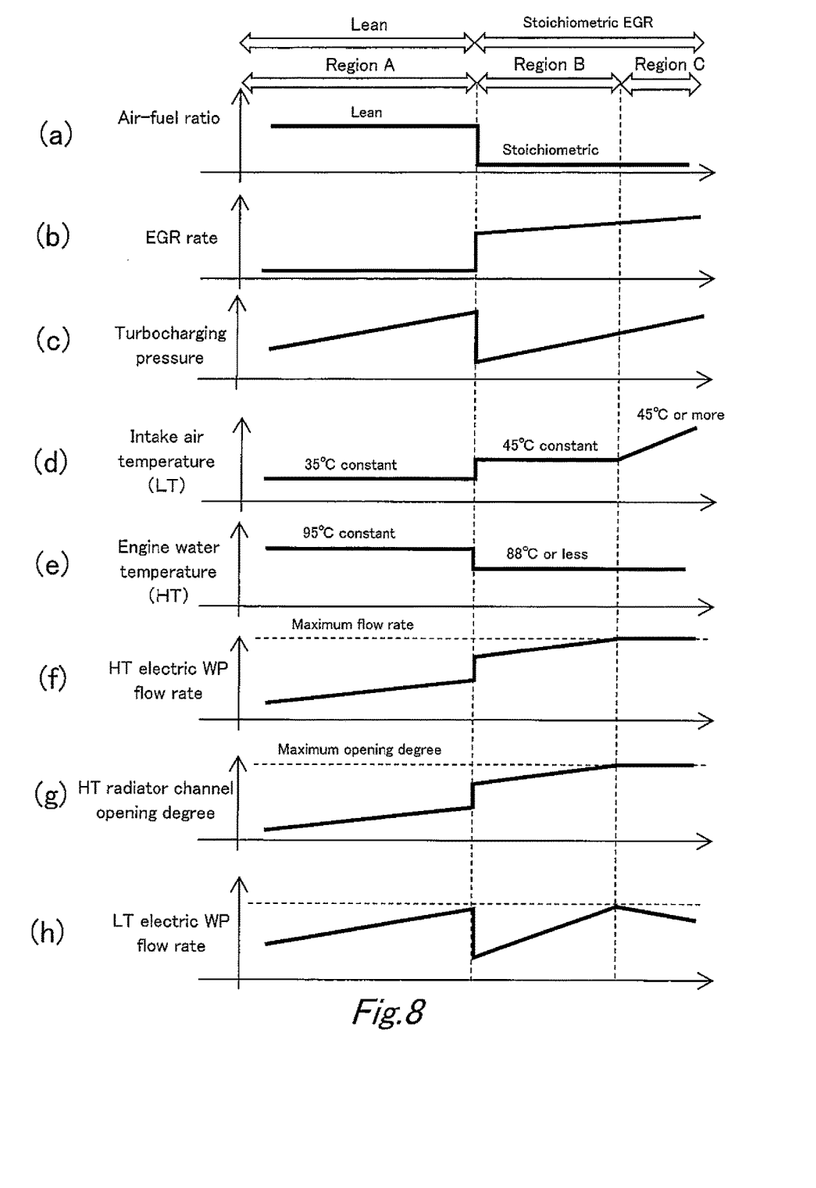
FIG. 8 is a time chart illustrating one example of operations of the internal combustion engine when the intake air temperature control and the engine water temperature control are executed.

FIG. 8 is a time chart illustrating one example of operations of the engine 1 when intake air temperature control and engine water temperature control are executed according to the above described control flow. In FIG. 8, changes with time in the following parameters are illustrated for a case where, with respect to FIG. 6, the load is increased from a region A to a region C while the engine speed is kept constant. The parameters are: (a) the air-fuel ratio, (b) the EGR rate, and (c) the turbocharging pressure that are parameters relating to switching of the operation mode; (d) the intake air temperature, and (e) the engine water temperature that are controlled variables; (f) the electric water pump flow rate, and (g) the opening degree of the radiator flow channel (third HT flow channel 56) that are manipulated variables of the HT cooling system 50; and (h) the electric water pump flow rate that is a manipulated variable of the LT cooling system 30.

First, in region A in which the engine 1 is operated in the lean mode, the air-fuel ratio is set to a predetermined lean air-fuel ratio and the EGR rate is set to zero. The turbocharging pressure is then increased in accordance with an increase in the load. Although the temperature of intake air entering the intercooler 72 rises in accordance with an increase in the turbocharging pressure, the intake air temperature measured by the intake-air temperature sensor 76 is kept constant at 35° C. To realize this, the electric water pump flow rate of the LT cooling system 30 is increased in accordance with an increase in the load. Further, the engine water temperature measured by the engine water temperature sensor 68 is kept constant at 95° C. Since cooling loss increases in accordance with an increase in the load, the electric water pump flow rate and the radiator flow-channel opening degree of the HT cooling system 50 are increased in accordance with an increase in the load so that the engine water temperature is constant.

Subsequently, when the operating point of the engine 1 moves from region A to region B, the operation mode is switched from the lean mode to the stoichiometric EGR mode. This switching of the operation mode is realized by switching the air-fuel ratio from the lean air-fuel ratio to the theoretical air-fuel ratio, and also increasing the EGR rate in a step response manner from zero to a value in accordance with the engine speed and target torque, and decreasing the turbocharging pressure in a step response manner to decrease the air amount.

Further, when the operating point of the engine 1 moves from region A to region B, the intake air temperature is raised from 35° C. to 45° C., and the engine water temperature decreases to a temperature equal to or less than 88° C. To realize this, at the timing of switching the operation mode, the electric water pump flow rate and the radiator flow-channel opening degree of the HT cooling system 50 are increased in a step response manner, and the electric water pump flow rate of the LT cooling system 30 is decreased in a step response manner.

In region B in which the engine 1 is operated in the stoichiometric EGR mode, the intake air temperature is kept constant at 45° C. To realize this, the electric water pump flow rate of the LT cooling system 30 is increased in accordance with an increase in the load. Further, the engine water temperature is maintained at a temperature that is equal to or less than 88° C. To realize this, the electric water pump flow rate and the radiator flow-channel opening degree of the HT cooling system 50 are increased in accordance with an increase in the load.

Eventually, when the operating point of the engine 1 moves to region C that is a high load region, the electric water pump flow rate of the HT cooling system 50 reaches the maximum flow rate or the radiator flow-channel opening degree reaches the maximum opening degree. When such a situation occurs, a deficiency arises in the cooling capacity of the HT cooling system 50 as the load increases. Therefore, the electric water pump flow rate of the LT cooling system 30 is lowered to decrease the heat exchange amount of the radiator 40 positioned on the upstream side and increase by a corresponding amount the heat exchange amount of the radiator 60 positioned on the downstream side. Thereby, although the intake air temperature exceeds 45° C., the engine water temperature is maintained at a temperature that is equal to or less than 88° C.

What is claimed is:

1. An internal combustion engine which has an EGR apparatus that recirculates a part of exhaust gas to an intake passage, and which, in accordance with an operating region, switches between a stoichiometric EGR mode in which operation is performed at a theoretical air-fuel ratio while executing recirculation by means of the EGR apparatus and a lean mode in which operation is performed at an air-fuel ratio that is leaner in fuel than the theoretical air-fuel ratio without performing EGR by means of the EGR apparatus, comprising:

an intake air temperature adjustment apparatus that adjusts a temperature of intake air that enters a combustion chamber, and a control apparatus that operates at least the intake air temperature adjustment apparatus;

wherein the control apparatus is configured to operate the intake air temperature adjustment apparatus so that the temperature of intake air enters a first temperature region when the internal combustion engine operates in the stoichiometric EGR mode, and to operate the intake air temperature adjustment apparatus so that the temperature of intake air enters a second temperature region which is a lower temperature region than the first temperature region when the internal combustion engine operates in the lean mode.

2. The internal combustion engine according to claim 1, further comprising an engine water temperature adjustment apparatus that adjusts a temperature of cooling water that flows through an exhaust side of an engine head, wherein the control apparatus is configured to operate the engine water temperature adjustment apparatus so that the temperature of cooling water that passes through the engine head enters a third temperature region when the internal combustion engine operates in the stoichiometric EGR mode, and to operate the engine water temperature adjustment apparatus so that the temperature of cooling water that passes through the engine head enters a fourth temperature region that is a higher temperature region than the third temperature region when the internal combustion engine operates in the lean mode.

3. The internal combustion engine according to claim 2, wherein:

the intake air temperature adjustment apparatus is configured to adjust the temperature of intake air by heat exchange with outside air;

the engine water temperature adjustment apparatus is configured to cool cooling water by heat exchange with the outside air which undergoes heat exchange at the intake air temperature adjustment apparatus; and when the internal combustion engine operates in the stoichiometric EGR mode, the control apparatus operates the intake air temperature adjustment apparatus so as to allow the temperature of intake air to become higher than the first temperature region when the temperature of cooling water that passes through the engine head does not decrease as far as the third temperature region by only operation of the engine water temperature adjustment apparatus.

* * * * *